(12) United States Patent
Harada et al.

(10) Patent No.: US 8,876,257 B2
(45) Date of Patent: Nov. 4, 2014

(54) SEALANT, INKJET RECORDING HEAD USING SEALANT, AND METHOD FOR MANUFACTURING THE SAME

(71) Applicant: Canon Kabushiki Kaisha, Tokyo (JP)

(72) Inventors: Kouji Harada, Kawasaki (JP); Isao Imamura, Kawasaki (JP); Tadayoshi Inamoto, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 13/658,218

(22) Filed: Oct. 23, 2012

(65) Prior Publication Data

US 2013/0100210 A1    Apr. 25, 2013

(30) Foreign Application Priority Data

Oct. 25, 2011   (JP) .................................. 2011-233737

(51) Int. Cl.
| | |
|---|---|
| *B41J 2/14* | (2006.01) |
| *C08L 63/02* | (2006.01) |
| *H01R 43/00* | (2006.01) |
| *C08G 59/24* | (2006.01) |
| *C08G 59/68* | (2006.01) |
| *C08G 59/06* | (2006.01) |
| *C08L 63/00* | (2006.01) |

(52) U.S. Cl.
CPC .............. *C08G 59/063* (2013.01); *C08G 59/24* (2013.01); *C08G 59/68* (2013.01); *C08L 63/00* (2013.01)
USPC .............................................. 347/50; 347/58

(58) Field of Classification Search
CPC .................... C08L 63/00; C08L 63/10; H01L 2224/16227; H01L 24/14; H01L 24/16; H01L 51/5203; H01L 51/5243; H01L 51/5246; H01L 51/5253
USPC .............................. 347/40, 49–50, 56, 58, 59
See application file for complete search history.

(56) References Cited

U.S. PATENT DOCUMENTS

| | | | | |
|---|---|---|---|---|
| 7,957,151 | B2 * | 6/2011 | Aita et al. ..................... | 361/749 |
| 8,011,778 | B2 * | 9/2011 | Harada et al. ................. | 347/100 |
| 2005/0003199 | A1 | 1/2005 | Takaya | |

FOREIGN PATENT DOCUMENTS

| | | |
|---|---|---|
| CN | 101228621 A | 7/2008 |
| EP | 2248838 A1 | 11/2010 |
| JP | 2007-331334 A | 12/2007 |
| JP | 2010-000700 A | 1/2010 |
| WO | 2010/036953 A2 | 4/2010 |

* cited by examiner

*Primary Examiner* — Thinh Nguyen
(74) *Attorney, Agent, or Firm* — Canon U.S.A., Inc., IP Division

(57) ABSTRACT

A sealant contains a dicyclopentadiene type epoxy resin represented by formula 1 below, a hydrogenated bisphenol A epoxy resin, and a photo-induced cationic polymerization initiator, in which the content of the dicyclopentadiene type epoxy resin is 15 to 40 parts by mass relative to 100 parts by mass of the total mass of epoxy resins contained in the sealant.

[Formula 1]

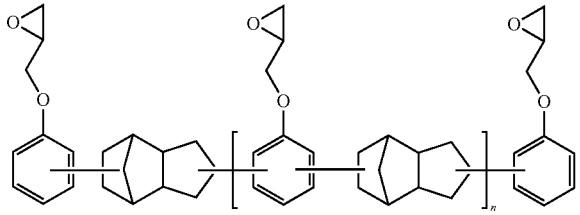

where n represents an integer of 0 to 2.

6 Claims, 7 Drawing Sheets

SEALANT, INKJET RECORDING HEAD USING SEALANT, AND METHOD FOR MANUFACTURING THE SAME

BACKGROUND OF THE INVENTION

1. Field of the Invention

The present invention relates to a sealant, an inkjet recording head using a sealant, and a method for manufacturing the same.

2. Description of the Related Art

In an inkjet recording apparatus, recording is performed by ejecting ink from ejection ports toward recording paper. The inkjet recording apparatus generally includes an inkjet recording head that ejects ink from ejection ports and a supply member (supply system) that supplies ink to the recording head. The recording head generally includes an ejection element substrate, a wiring member, and a supporting member.

Examples of a typical recording method using an inkjet recording apparatus include a method using electrothermal transducers. In this method, recording is performed on recording paper as described below. An electrothermal transducer is provided in a pressurizing chamber disposed in the vicinity of an ejection port of an ejection element substrate, and thermal energy is imparted to ink by application of an electrical pulse serving as a driving signal. Using a pressure of ink foaming (boiling) generated due to a phase change of ink at that point, ink is ejected from a minute ejection port. The electrical pulse is applied from the outside using a wiring member (wiring substrate) or the like. The wiring substrate and the ejection element substrate are electrically connected to each other by inner lead bonding (ILB) or the like. Such an electrical connection portion is sealed with a sealant in order to prevent corrosion and short-circuiting of electrodes and wiring, which perform electrical connection, due to ink mist or the like that permeates the space at the time of ejection.

An example of a method for manufacturing such an inkjet recording head will be described below. FIGS. 1A to 1D are views used for explaining the example of a method for manufacturing the recording head. As shown in FIG. 1A, first, a supporting member A (supporting plate) 3a and a supporting member B 3b are joined to each other to form a supporting member (supporting substrate) 3 configured to support ejection element substrates and a wiring substrate. Next, as shown in FIG. 1B, ejection element substrates 2a and 2b are joined to the supporting member 3. Then, as shown in FIG. 1C, a wiring substrate 1 having openings is joined onto the supporting substrate 3 such that the ejection element substrates 2a and 2b are arranged inside the openings. That is, the wiring substrate 1 and the supporting plate 3a are arranged so as to surround the ejection element substrates 2a and 2b. Then, driving electrodes (not shown) of the ejection element substrates and connecting electrodes (not shown) of the wiring substrate are electrically connected with inner leads or the like. More specifically, plating or ball bumps are formed on pads of the ejection element substrates, and inner leads of the wiring substrate are connected to the plating or ball bumps. Finally, as shown in FIG. 1D, an electrical connection portion between each of the ejection element substrates and the wiring substrate 1 is coated and sealed with sealants 4a and 4b.

Regarding the sealants used in the electrical connection portion between the ejection element substrate and the wiring substrate, it is generally desired that the sealant provided on the upper side (surface side) of the inner leads and the sealant provided on the lower side (supporting member side) of the inner leads have different properties. Specifically, on the lower side of the inner leads, when the sealant is applied from the upper side of the inner leads, the sealant is required to pass through the spaces between the leads and wrap around the lower side of the leads such that the lower side is satisfactorily sealed with the sealant. Therefore, on the lower side of the leads, a sealant having a low viscosity that satisfies the above condition can be used.

On the other hand, in the case where a sealant having such a low viscosity is used on the upper side of the inner leads, the amount of the sealant flowing from the upper side of the leads may be more than necessary, and the upper parts of the leads may not be sufficiently sealed. Therefore, on the upper side of the inner leads, it is required to use a sealant having a high viscosity such that a certain amount or more of the sealant remains on the inner leads and the upper parts of the inner leads can be satisfactorily sealed. Furthermore, on the upper side of the inner leads, when the vicinity of the ejection ports of the recording head is wiped with a blade, the sealant at the electrical connection portion is subjected to friction with the blade. Consequently, the sealant is required to have durability against the friction. Therefore, the sealant is required to exhibit high viscoelasticity after being cured. That is, on the upper side of the leads, it is required to use a sealant that has high viscosity and exhibits a high elastic modulus after being cured.

For the reasons described above, to date, two kinds of sealant have been used. Referring to FIG. 1D, a sealant 4a is used as a sealant used on the upper side of the inner leads, and a sealant 4b is used as a sealant used on the lower side of the inner leads.

As the sealant which can be used on the upper side of the inner leads, which can be cured at a low temperature, and by which print quality and high reliability can be obtained, a photo- and heat-induced, cationic curable resin composition containing an alicyclic epoxy and an oxetane with high cationic reactivity is disclosed in Japanese Patent Laid-Open No. 2007-331334 (Patent Literature 1).

However, when two kinds of sealant having different viscosities are used in sealing the inner leads as those described above, manufacturing steps, such as a sealant application step and the subsequent thermal curing step, tend to become complicated. In particular, since the sealants having different properties are used in succession, conditions for thermal curing become stricter. Furthermore, in the case where the strict conditions cannot be satisfied and the cure state is unstable, two kinds of sealant may dissolve each other, resulting in an insufficient effect.

In order to overcome such a phenomenon, Japanese Patent Laid-Open No. 2010-000700 (Patent Literature 2) discloses a method for manufacturing a recording head including the following step. In this step, an activation energy ray-curable composition is used as a sealant, and during the period from the start to the end of application of the activation energy ray-curable composition to an electrical connection portion, the activation energy ray-curable composition is irradiated with activation energy rays, thereby completing sealing of the electrical connection portion with one kind of sealant.

In this step, since it takes a certain period of time from the irradiation of activation energy rays to the start of curing of the activation energy ray-curable composition as the sealant, the sealant can wrap around the lower side of the leads during that period. As a result, a necessary amount of the sealant can be applied to the lower side of the leads. Then, the activation energy ray-curable composition starts to be cured and is gradually cured. Consequently, the composition does not flow into the lower side of the leads or does not flow out of the sealing points, and the composition is gradually deposited on the upper side of the leads. Thus, it is possible to apply the sealant with a sufficient thickness.

Regarding the resin compositions disclosed in Patent Literatures 1 and 2, sufficient productivity and reliability can be obtained in the current structure of inkjet recording heads. However, hereafter, a reduction in the gap between ink ejection ports and media for the purpose of improving print quality (ink landing accuracy) and use of highly permeable ink (a change in polar solvents, an increase in the amount thereof, or the like) for the purpose of improving image quality are expected, and sealing of electrical connection portions are required to have higher reliability.

Furthermore, in the sealing step using one kind of sealant disclosed in Patent Literature 2, the activation energy ray-curable composition used as the sealant is required to have the following properties. That is, it is required that curing does not proceed immediately after irradiation of the composition with activation energy rays; the composition is gradually cured after the lower side of leads has been buried; and the composition has good electrical properties such that highly reliable electrical connection portions can be formed in an environment in contact with ink after having undergone a heating step. That is, it is required to make a very unique design such that while delaying reactivity (achieving delayed curability), the final cured product has very high electrical properties. There is a small need for such characteristics in the industry, and moreover, there is little knowledge about material design therefor.

SUMMARY OF THE INVENTION

Aspects of the present invention provide a wiring protection sealant for an inkjet recording head, which does not complicate the manufacturing process, which does not decrease productivity even in the case where only one kind of sealant is used, and which imparts very high reliability to sealing of an electrical connection portion, and also provides a recording head using the sealant and a method for manufacturing the same.

[1] According to an aspect of the present invention, a sealant contains a dicyclopentadiene type epoxy resin represented by formula 1 below, a hydrogenated bisphenol A epoxy resin, and a photo-induced cationic polymerization initiator, in which the content of the dicyclopentadiene type epoxy resin is 15 to 40 parts by mass relative to 100 parts by mass of the total mass of epoxy resins contained in the sealant.

[Formula 1]

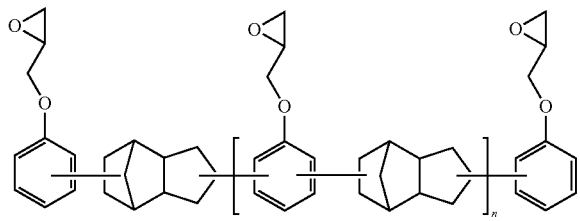

where n represents an integer of 0 to 2.

[2] According to another aspect of the present invention, an inkjet recording head includes, at least, an ejection element substrate which includes a nozzle portion having an ejection port configured to eject ink, an energy-generating unit configured to generate energy for ejecting ink from the ejection port, a driving electrode that receives a driving signal for driving the energy-generating unit, and a substrate provided with an ink supply port for supplying ink to the nozzle portion; a wiring member provided with a connecting electrode that sends the driving signal for driving the energy-generating unit; and a supporting member which has an ink supply passage for supplying ink to the ink supply port and which holds and fixes the ejection element substrate and the wiring member, the driving electrode and the connecting electrode being electrically connected to each other, an electrical connection portion between the driving electrode and the connecting electrode being sealed with at least one sealant, in which at least one of the at least one sealant is the sealant according to item [1] described above.

[3] According to another aspect of the present invention, a method for manufacturing an inkjet recording head including an ejection element substrate which includes a nozzle portion having an ejection port configured to eject ink, an energy-generating unit configured to generate energy for ejecting ink from the ejection port, a driving electrode that receives a driving signal for driving the energy-generating unit, and a substrate provided with an ink supply port for supplying ink to the nozzle portion; a wiring member provided with a connecting electrode that sends the driving signal for driving the energy-generating unit; and a supporting member which has an ink supply passage for supplying ink to the ink supply port and which holds and fixes the ejection element substrate and the wiring member, the driving electrode and the connecting electrode being electrically connected to each other, an electrical connection portion between the driving electrode and the connecting electrode being sealed with a sealant is provided, the method including a step of irradiating the sealant with activation energy rays after the sealant has been applied to the electrical connection portion or during the period from the start to the end of application of the sealant, in which, as the sealant, at least the sealant according to item [1] described above is used.

Further features of the present invention will become apparent from the following description of exemplary embodiments with reference to the attached drawings.

Figure 5A:
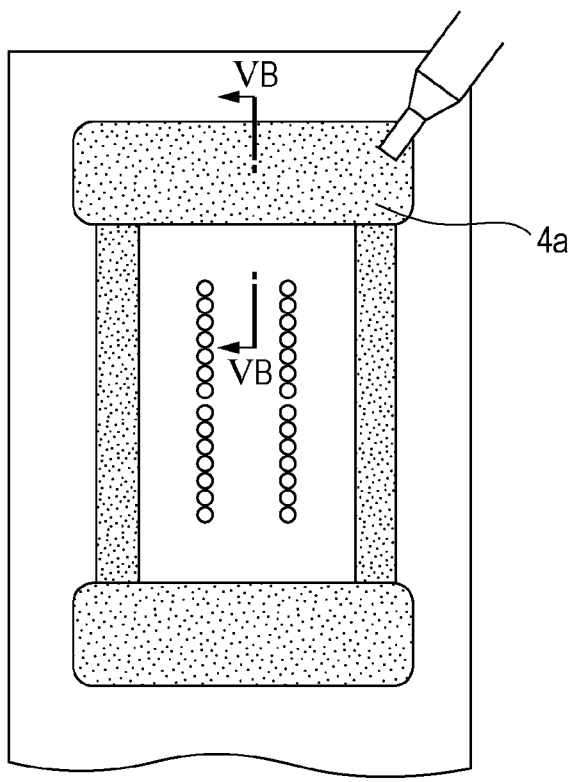
FIGS. 5A and 5B are views showing a state after a sealant A has been applied in the manufacturing method according to the first embodiment of the present invention, FIG. 5A being a partially enlarged plan view of the ejection port side, FIG.

5B being a partially enlarged cross-sectional view taken along the line VB-VB of FIG. 5A.

Figure 6A:
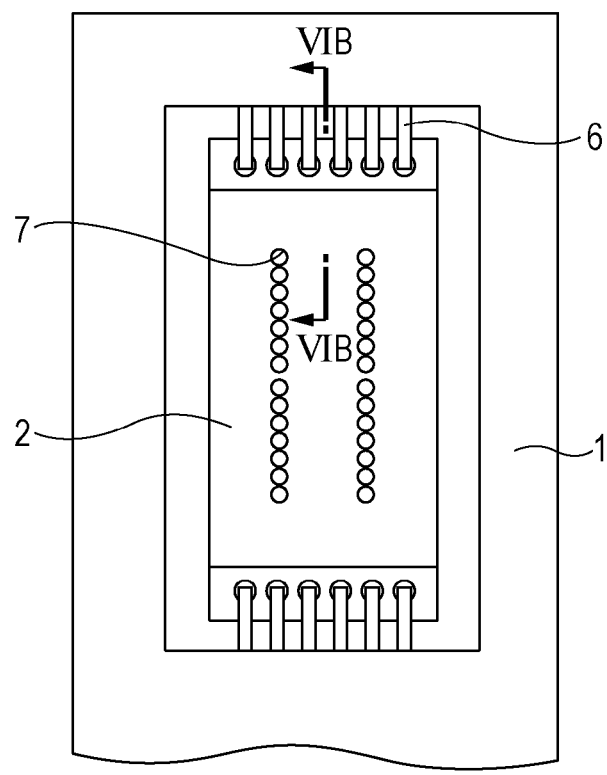
Figure 6B:
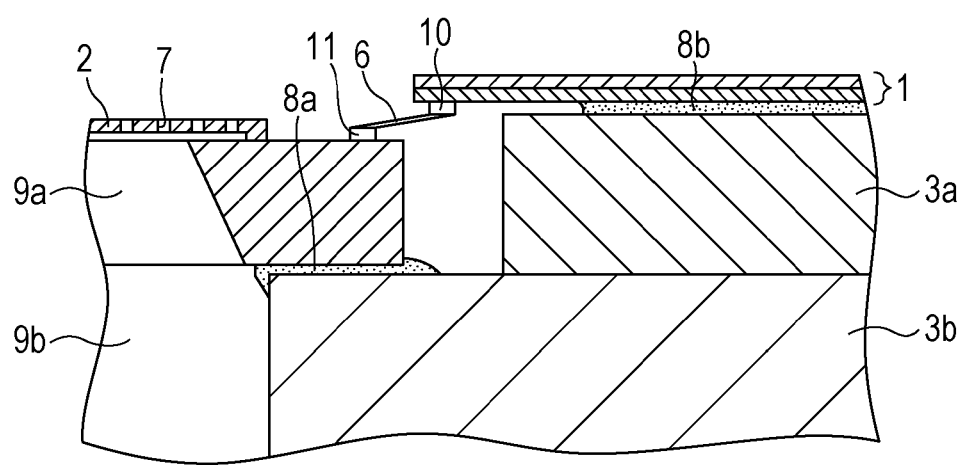

FIGS. 6A and 6B are views showing a state before application of a sealant in a manufacturing method according to a second embodiment of the present invention, FIG. 6A being a partially enlarged plan view of an ejection port side, FIG. 6B being a partially enlarged cross-sectional view taken along the line VIB-VIB of FIG. 6A.

Figure 7A:
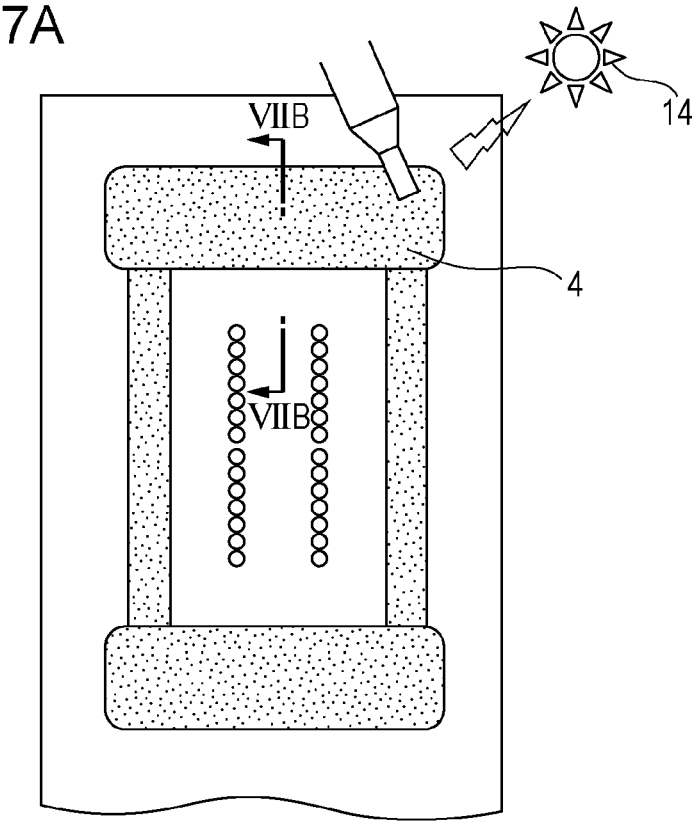
Figure 7B:
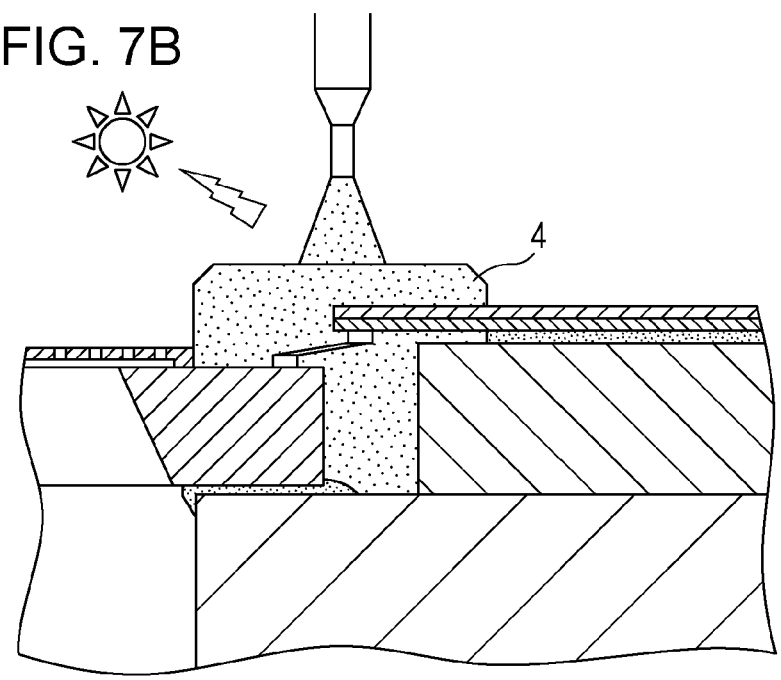

FIGS. 7A and 7B are views showing a state after a sealant has been applied in the manufacturing method according to the second embodiment of the present invention, FIG. 7A being a partially enlarged plan view of the ejection port side, FIG. 7B being a partially enlarged cross-sectional view taken along the line VIIB-VIIB of FIG. 7A.

DESCRIPTION OF THE EMBODIMENTS

Sealant

A wiring protection sealant for an inkjet recording head (hereinafter, may also be referred to as a "wiring protection sealant" or "sealant") will be described as an example of a sealant according to the present invention. The wiring protection sealant for an inkjet recording head is used in an inkjet recording head to be mounted on an inkjet recording apparatus which performs recording by ejecting a recording liquid (ink) toward recording paper.

The sealant according to aspects of the present invention contains, at least, a dicyclopentadiene type epoxy resin represented by formula 1 below, a hydrogenated bisphenol A epoxy resin, and a photo-induced cationic polymerization initiator.

[Formula 1]

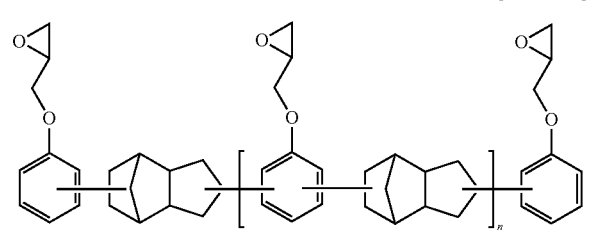

where n represents an integer of 0 to 2.

The components of the wiring protection sealant according to aspects of the present invention will be described in detail below.

(Dicyclopentadiene Type Epoxy Resin)

The dicyclopentadiene type epoxy resin used in aspects of the present invention has a higher epoxy equivalent weight than a common epoxy resin (e.g., a bisphenol A epoxy resin).

Furthermore, in recent years, it has been known that, regarding the hygroscopicity of a resin-cured product, as the percentage of oxygen in the cured product is decreased, moisture absorption is more suppressed. In aspects of the present invention, by using an epoxy resin represented by formula 1 having a high epoxy equivalent weight, the percentage of oxygen in the resin-cured product can be decreased compared with the existing case, and moisture absorption of the resin-cured product can be suppressed. Furthermore, the same effect can be obtained for ink which is mostly made of moisture, and ink absorption can be suppressed as is the case with moisture absorption. Furthermore, as the content of the dicyclopentadiene type epoxy resin in the sealant increases, ink absorption of the resin-cured product, i.e., the sealant-cured product, is more suppressed, thus being more advantageous in terms of electrical properties.

In order to obtain good curing properties (resistance to ink absorption, adhesiveness, and the like) of the sealant-cured product, the dicyclopentadiene type epoxy resin can have two or more epoxy groups in its molecular structure, that is, can be bifunctional or more. For example, the dicyclopentadiene type epoxy resin can have three or more epoxy groups in its molecular structure, that is, can be trifunctional or more.

The content of the dicyclopentadiene type epoxy resin is 15 to 40 parts by mass relative to 100 parts by mass of the total mass of epoxy resins (epoxy compounds) contained in the sealant. Note that the total mass of epoxy resins in the sealant includes, at least, the mass of the dicyclopentadiene type epoxy resin represented by formula 1 and the mass of the hydrogenated bisphenol A epoxy resin. In the case where another epoxy resin is added to the sealant, the mass of the other epoxy resin is also included in the total mass.

When the content of the dicyclopentadiene type epoxy resin is less than 15 parts by mass, the expected effect of suppressing ink absorption is weakened. When the content of the dicyclopentadiene type epoxy resin is more than 40 parts by mass, since a large amount of the epoxy resin having a high epoxy equivalent weight is included, curing proceeds too fast after irradiation with activation energy rays (e.g., ultraviolet light), and it becomes difficult to maintain flowability of the resin, which may results in failure in the sealing of the electrical connection portion in some cases.

Furthermore, the total content of the epoxy resins in the sealant can be 60% by mass or more from the standpoint of obtaining good electrical properties.

(Hydrogenated Bisphenol A Epoxy Resin)

The hydrogenated bisphenol A epoxy resin used in aspects of the present invention has an epoxy group and a hydrogenated bisphenol A structure (a structure represented by formula 3 obtained by hydrogenating bisphenol A) in its molecular structure.

[Formula 3]

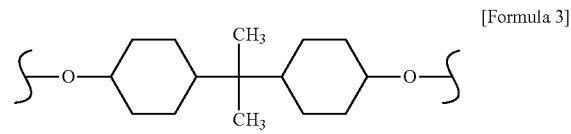

As described above, in the hydrogenated bisphenol A epoxy resin used in aspects of the present invention, since double bonds of aromatic rings in bisphenol A are hydrogenated, the movement of electrons due to the movement of $7c$ electrons is suppressed, and the resistance of the cured product can be increased.

As the hydrogenated bisphenol A epoxy resin, a commercially available hydrogenated bisphenol A epoxy resin may be used. However, from the standpoint of reducing the content of a reactive diluent, which is generally used in order to adjust viscosity, a liquid hydrogenated bisphenol A epoxy resin represented by formula 2 can be used.

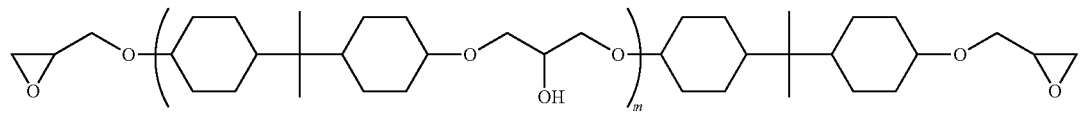

[Formula 2]

where m represents 0 or 1.

The content of the hydrogenated bisphenol A epoxy resin in the sealant can be 35 parts by mass or more and 80 parts by mass or less relative to 100 parts by mass of the total mass of epoxy resins contained in the sealant. When the content is 35 parts by mass or more, a large increase in the content of another epoxy resin (e.g., a reactive diluent or the like) can be easily prevented, and desired curing properties can be easily obtained. When the content is 80 parts by mass or less, the effect of suppressing ink absorption of the dicyclopentadiene type epoxy resin can be easily obtained.

(Photo-Induced Cationic Polymerization Initiator)

Specific examples of the photo-induced cationic polymerization initiator used in aspects of the present invention include aromatic onium salts [refer to J. POLYMER SCI: Symposium No. 56 383-395 (1976)], IRGACURE 261 (registered trademark) marketed by Ciba-Geigy Corp.; SP-150 (trade name) and SP-170 (trade name) marketed by ADEKA (former Asahi Denka Kogyo); triazine A (trade name), triazine PMS (trade name), triazine PP (trade name), and triazine B (trade name) marketed by Nihon Siber Hegner K.K.; and Photoiniciator 2074 (trade name) marketed by Rhodia Japan. In addition, photo-induced cationic polymerization initiators known in the inkjet recording head field can be appropriately used.

The content of the photo-induced cationic polymerization initiator in the sealant can be 0.5% by mass or more from the standpoint of obtaining sufficient electrical properties after being cured, and can be 5.0% by mass or less from the standpoint of maintaining flowability immediately after irradiation with activation energy rays.

(Other Epoxy Resins and Additives)

The sealant may contain the epoxy resins and additives described below, in addition to the two types of epoxy resin and the photo-induced cationic polymerization initiator.

For example, in order to adjust the viscosity of the sealant, a reactive diluent, such as an epoxy resin, can be added in such an amount that does not impair the advantageous effects according to aspects of the present invention. As the reactive diluent, for example, epoxy resins, such as DENACOL EX-121 (trade name; manufactured by Nagase ChemteX Corporation) and ED509-S (trade name; manufactured by ADEKA Corporation), may be suitably used.

Furthermore, the sealant may contain a heat-induced cationic polymerization initiator, in addition to the photo-induced cationic polymerization initiator. Specific example of the heat-induced cationic polymerization initiator include San-Aid SI-60L (trade name), San-Aid SI-80L (trade name), and San-Aid SI-100L (trade name) marketed by Sanshin Chemical Industry Co., Ltd.; and CP-66 (trade name) and CP-(trade name) marketed by ADEKA (former Asahi Denka Kogyo). Furthermore, an aromatic onium salt and a reducing agent may be used together (refer to Japanese Patent Laid-Open No. 54-102394 and J. POLYMER SCI: Polymer Chemical Edition Vol121, 97-109 (1983)).

Besides the reactive diluent and the heat-induced cationic polymerization initiator, various additives may optionally be used in the sealant according to aspects of the present invention. Examples thereof include a silane coupling agent serving as an adhesion improver, and a filler used for adjusting viscosity. Specific examples of the silane coupling agent that can be suitably used include A-186 and A-187 (trade names; manufactured by Nippon Unicar Co., Ltd).

Furthermore, according to aspects of the present invention, a fine filler, such as quartz, may optionally be added in order to adjust viscosity.

However, the sealant according to aspects of the present invention desirably does not contain an alicyclic epoxy resin having two or more alicyclic epoxy functional groups having high cationic reactivity, which is not of glycidyl ether type. When the alicyclic epoxy resin having very high cationic reactivity is not included in the sealant, it is possible to easily prevent a rapid decrease in flowability of the resin due to the start of the polymerization reaction. Consequently, in the process of sealing the electrical connection portion with the sealant, it is possible to easily prevent occurrence of failures, such as inclusion of bubbles and incomplete coating. Furthermore, the sealant according to aspects of the present invention can contain only epoxy resins having glycidyl ether type epoxy groups only in their molecular structure. Incorporation of glycidyl ether type epoxy resins only can easily suppress occurrence of failures in the process of sealing the electrical connection portion.

Since the sealant according to aspects of the present invention contains, as epoxy resins, at least the hydrogenated bisphenol A epoxy resin and a specified amount of the dicyclopentadiene type epoxy resin, the percentage of oxygen in the resin can be reduced, and ink absorption of the cured product can be suppressed at a very high level. Consequently, when the sealant is used for an electrical connection portion of an inkjet recording head, ink absorption (ink-absorbing property) can be suppressed. Furthermore, it is possible to suppress a decrease in electrical properties, peeling off of the sealant due to swelling of the sealant, and the like.

<Inkjet Recording Head>

In an inkjet recording head according to aspects of the present invention, an electrode portion (electrical connection portion) is protected (sealed) with at least one kind of sealant. As the at least one kind of sealant, a sealant according to aspects of the present invention is used. That is, in the inkjet recording head according to aspects of the present invention, at least part of the electrode portion is sealed with the sealant according to aspects of the present invention.

FIGS. 3A to 5B are views used for explaining the case where an electrical connection portion is sealed using two kinds of sealant. FIGS. 6A to 7B are views used for explaining the case where an electrical connection portion is sealed using only one kind of sealant. Furthermore, FIGS. 3A, 3B, 6A, and 6B each show a state before application of the sealant, and FIGS. 5A, 5B, 7A, and 7B each show a state after the electrical connection portion has been sealed with the sealant.

Figure 1A:
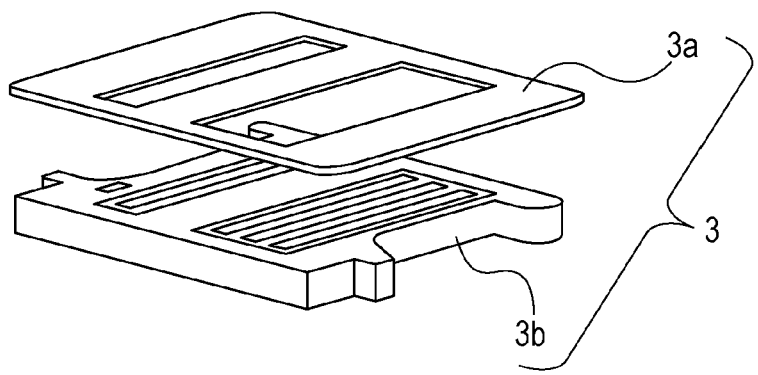
FIGS. 1A to 1D are views used for explaining an example of an existing method for manufacturing an inkjet recording head.
Figure 1B:
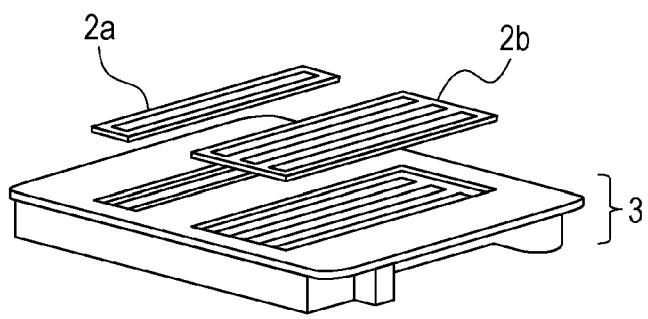
Figure 1C:
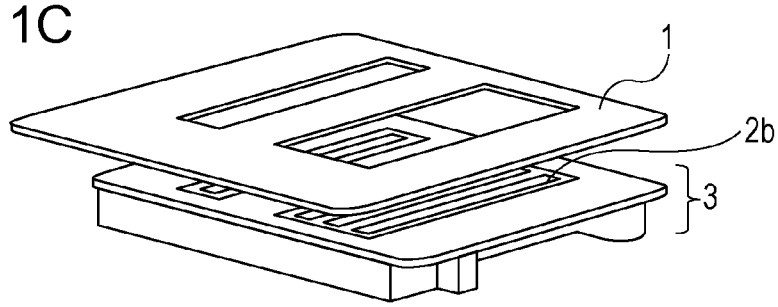
Figure 1D:
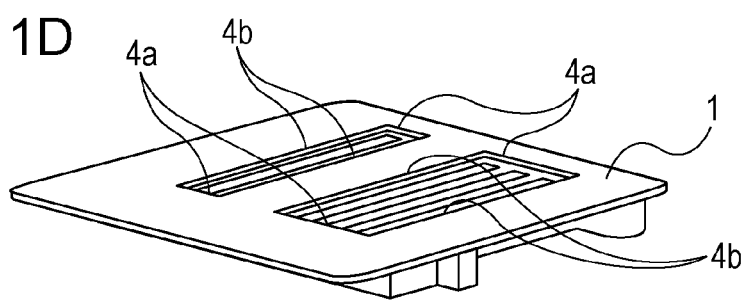
Figure 2A:
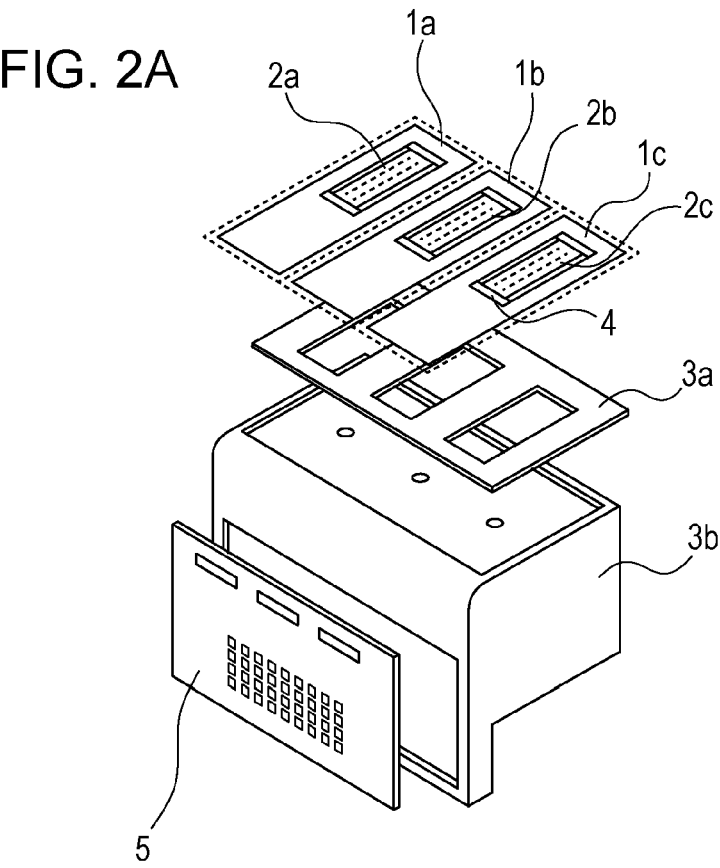
FIGS. 2A and 2B are perspective views showing a structure of an inkjet recording head according to an embodiment of the present invention, FIG. 2A being an exploded view, FIG. 2B being a view of an assembled recording head.
Figure 2B:
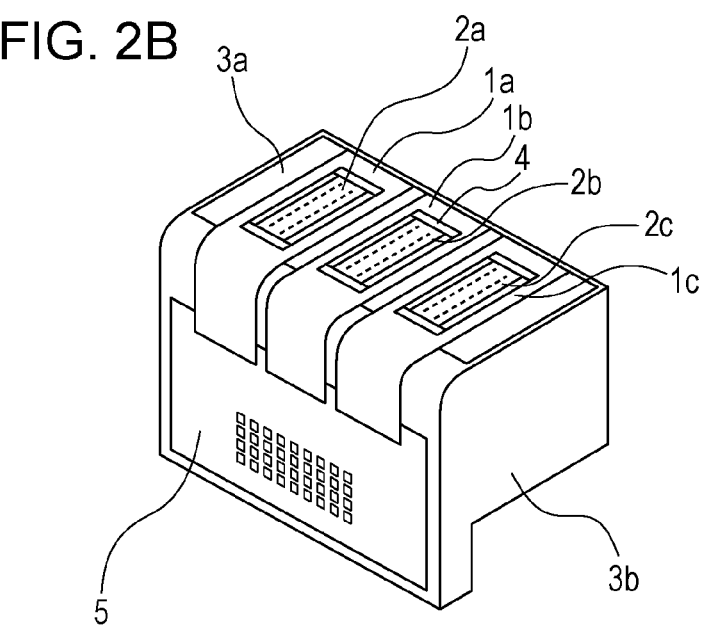
Figure 3A:
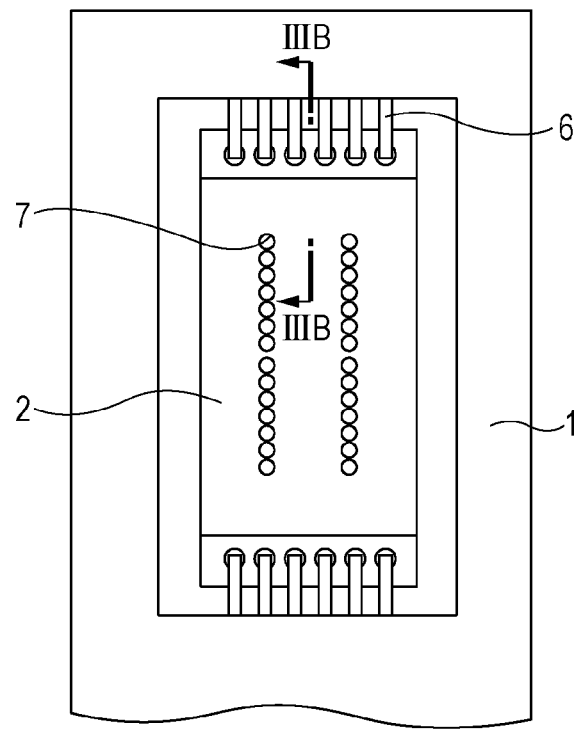
FIGS. 3A and 3B are views showing a state before application of two kinds of sealant in a manufacturing method according to a first embodiment of the present invention, FIG. 3A being a partially enlarged plan view of an ejection port side, FIG. 3B being a partially enlarged cross-sectional view taken along the line IIIB-IIIB of FIG. 3A.
Figure 3B:
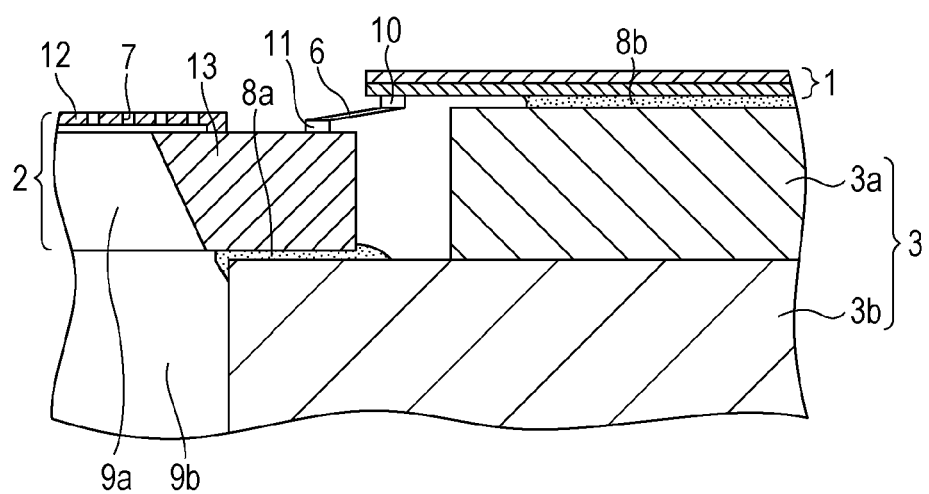

As shown in FIGS. 3A and 3B, a recording head according to aspects of the present invention includes, a least, a wiring member (wiring substrate) 1, an ejection element substrate 2, and a supporting member 3. Furthermore, FIGS. 2A and 2B show a recording head having a plurality of ejection element substrates, i.e., ejection element substrates 2a to 2c, and a plurality of wiring members, i.e., wiring members 1a to 1c. FIGS. 2A and 2B are perspective views showing a structure of an inkjet recording head according to an embodiment of the present invention, FIG. 2A being an exploded view, FIG. 2B being a view of an assembled recording head. The recording head is provided with an integrated wiring board 5 which integrates electrical signals for the wiring substrates 1a to 1c.

As shown in FIGS. 3A and 3B, an ejection element substrate 2 is fitted in openings of a wiring substrate 1 and a supporting member 3a by tape automated bonding (TAB). A driving electrode 11 of the ejection element substrate and a connecting electrode 10 of the wiring substrate are electrically connected to each other by a lead 6 (electrical connection). In order to protect an electrical connection portion including the lead from corrosion due to a recording liquid (ink) and disconnection due to a force applied from the outside, the electrical connection portion is sealed with two kinds of sealant (sealants 4a and 4b) in FIGS. 5A and 5B, and with one kind of sealant (sealant 4) in FIGS. 2A and 2B and FIGS. 7A and 7B. The electrical connection portion can be constituted of the lead 6, the driving electrode 11, and the connecting electrode 10.

Furthermore, as shown in FIGS. 3A and 3B, the ejection element substrate 2 includes a nozzle portion 12 having an ejection port 7 which ejects ink, a recording element (energy-generating unit) (not shown), a driving electrode 11, and a substrate 13 provided with an ink supply port 9a configured to supply ink to the nozzle portion 12. The energy-generating unit is configured to generate energy in order to eject the recording liquid from the ejection port. For example, the energy-generating unit may be an electrothermal transducer. In the recording heads shown in FIGS. 2A to 7B, a plurality of energy-generating units (not shown) are arrayed. The driving electrode 11 is an electrode that receives a driving signal for driving the energy-generating unit.

FIG. 3B is a partially enlarged cross-sectional view taken along the line IIIB-IIIB of FIG. 3A. However, the ejection port 7 shown in FIG. 3B does not mean that the ejection port 7 lies on the IIIB-IIIB cross section.

Furthermore, as shown in FIGS. 3A and 3B, the wiring substrate 1 is provided with a connecting electrode 10 configured to send a driving signal for driving the energy-generating unit. The driving electrode and the connecting electrode can send and receive a driving signal via the lead 6. The supporting member 3 including two supporting members (3a and 3b) has an ink supply passage 9b for supplying ink to the ink supply port 9a and holds and fixes the ejection element substrate 2 and the wiring member 1. More specifically, the ejection element substrate 2 is arranged inside the opening of each of the wiring substrate 1 and the supporting plate 3a, and is bonded to the supporting member 3b by an adhesive 8a. Furthermore, the wiring substrate 1 is fixed on the supporting member 3a by an adhesive 8b.

The opening of the wiring substrate 1 and the opening of the supporting plate 3a have substantially the same size, and both openings are formed so as to be slightly larger than the ejection element substrate 2. In FIGS. 5A and 5B and FIGS. 7A and 7B, after bonding by the adhesives and electrical connection by the lead, each of the space between the ejection element substrate and the wiring substrate and the space between the ejection element substrate and the supporting plate 3a is sealed by a sealant. That is, in the opening of the supporting plate 3a, portions not provided with the ejection element substrate is sealed with the sealant.

<Method for Manufacturing Inkjet Recording Head>

A method for manufacturing an inkjet recording head according to aspects of the present invention can include a step of preparing an inkjet recording head before an electrical connection portion is sealed with a sealant, a step of applying a sealant to the recording head, a step of irradiating the sealant with activation energy rays, and a step of heating the sealant.

The timing of irradiation of the sealant with activation energy rays can be appropriately selected. For example, the irradiation step may be performed after the application step, or the application step and the irradiation step may be performed simultaneously. That is, irradiation with activation energy rays may be performed during application of the sealant. Alternatively, irradiation with activation energy rays may be performed both during application of the sealant and after application of the sealant.

In the manufacturing method according to aspects of the present invention, as the sealant that protects the electrical connection portion, at least a sealant according to aspects of the present invention is used. That is, as the sealant, only the sealant according to aspects of the present invention may be used, or the sealant according to aspects of the present invention and another sealant may be used in combination. In the case where the sealants are used in combination, i.e., a plurality of sealants including the sealant according to aspects of the present invention are used, the application step, the irradiation step, and the heating step can be performed for each of the sealants, or after all the sealants have been applied, the irradiation step or the heating step can be performed at one time. Furthermore, the irradiation step or the heating step may be omitted depending on properties of the starting material (e.g., resin) used for each of the sealants. Furthermore, conditions for irradiating the sealant with activation energy rays and conditions for heating the sealant can be appropriately set.

In the case where only the sealant according to aspects of the present invention is used as the sealant, the application step and the irradiation step can be performed simultaneously. That is, during the period from the start (start of contact between the sealant and the electrical connection portion) to the end of application of the sealant to the electrical connection portion, the sealant can be irradiated with activation energy rays. By performing irradiation with energy rays during this period (application of the sealant), compared with the case where irradiation with energy rays is performed only after completion of application of the sealant to the electrical connection portion, it is possible to easily prevent an excessive increase in the amount of the sealant permeating into the lower side of the lead and an excessive decrease in the amount of the sealant remaining on the upper side. Furthermore, compared with the case where application is performed after all the sealants have been irradiated with energy rays, it takes a longer time until the sealant is cured after irradiation, and a sufficient amount of the sealant can be easily permeated into the lower side of the lead.

During this period (during application of the sealant), the sealant may be continuously irradiated with activation energy rays or the sealant may be irradiated with activation energy rays only for a certain period. That is, the sealant is irradiated with activation energy rays at least once during this period, and the timing, the irradiation time, and the like can be appropriately adjusted depending on the curing state of the sealant, or the like. Furthermore, after the sealant has been applied, i.e., after the application step, irradiation with activation energy rays may be performed subsequently.

Two embodiments of the manufacturing method according to aspects of the present invention will be described below.

Figure 4A:
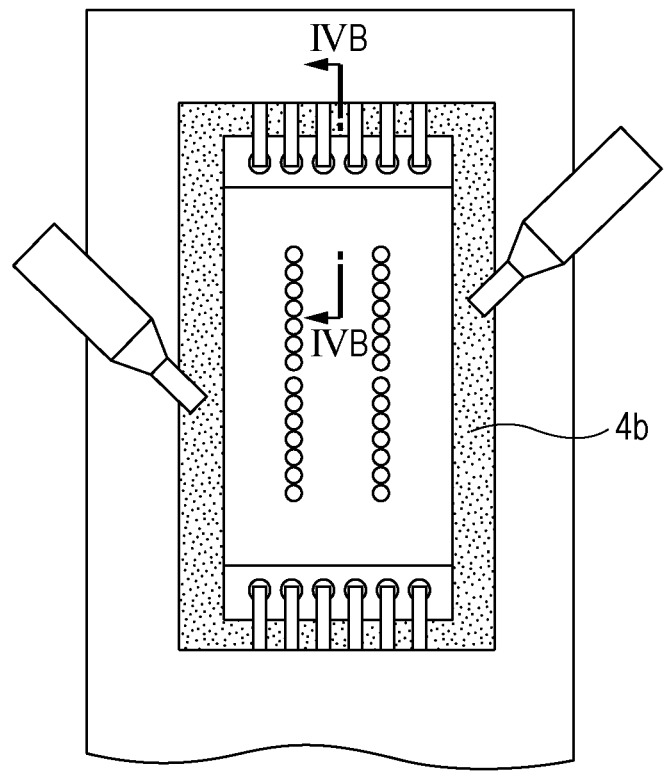
FIGS. 4A and 4B are views showing a state after a sealant B has been applied in the manufacturing method according to the first embodiment of the present invention, FIG. 4A being a partially enlarged plan view of the ejection port side, FIG. 4B being a partially enlarged cross-sectional view taken along the line IVB-IVB of FIG. 4A.

In a first embodiment, a sealant according to aspects of the present invention and another sealant are used in combination. An example of the first embodiment will be described in detail below with reference to FIGS. 3A to 5B. In this example, using two sealants including the sealant according to aspects of the present invention, an electrode portion of a recording head is sealed (covered). FIGS. 3A, 4A, and 5A are enlarged views of the vicinity of an ejection element substrate of an inkjet recording head, viewed from above ink ejection ports, and FIGS. 3B, 4B, and 5B are partially enlarged cross-sectional views taken along the line IIIB-IIIB, the line IVB-IVB, and the line VB-VB of FIGS. 3A, 4A, and 5A, respectively.

First, a recording head shown in FIGS. 3A and 3B is prepared. FIGS. 3A and 3B are views showing a state before application of sealants. A driving electrode of an ejection element substrate and a connecting electrode of a wiring substrate are electrically connected with each other by a lead.

Figure 4B:
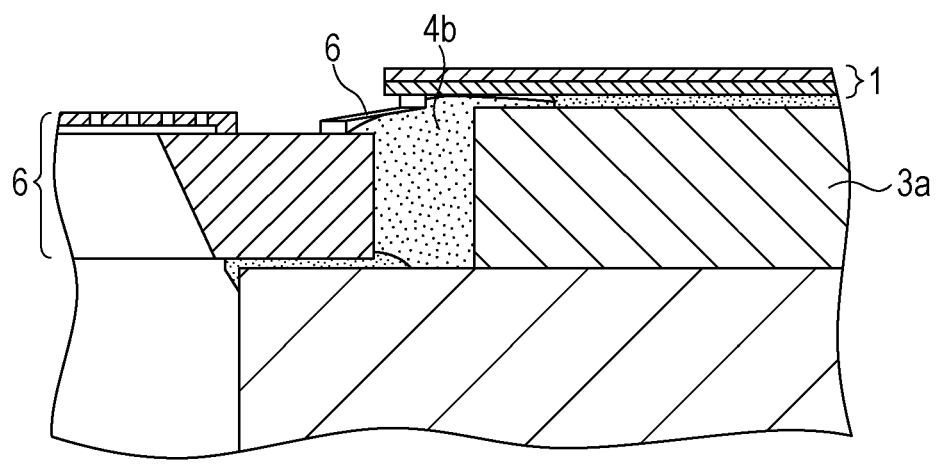

Next, as shown in FIGS. 4A and 4B, a sealant B 4b is applied, for example, from the upper side (surface side) of a lead 6, so as to bury the following portions (sealant B application step): the space between the supporting plate 3a and the ejection element substrate 2 (outer peripheral portion of the ejection element substrate 2), and the lower side (supporting member side) of the lead of the electrical connection portion of the substrates 1 and 2. After the application, heating is performed, for example, at 100° C. for 30 minutes to cure the surface of the sealant B (sealant B heating step). As the sealant B, a resin having a low viscosity is used. For example, a heat-curable or photo- and heat-curable epoxy resin may be used. In the case where a photo- and heat-curable epoxy resin is used as the sealant B, the heating step after application of the sealant B is not performed, and the surface (surface layer) of the sealant B is cured by irradiation with activation energy rays, such as ultraviolet light (sealant B irradiation step). Accordingly, by performing a heating operation after application of a sealant A and irradiation with energy rays, which will be described later, only one heating step is performed for the sealants.

Figure 5B:
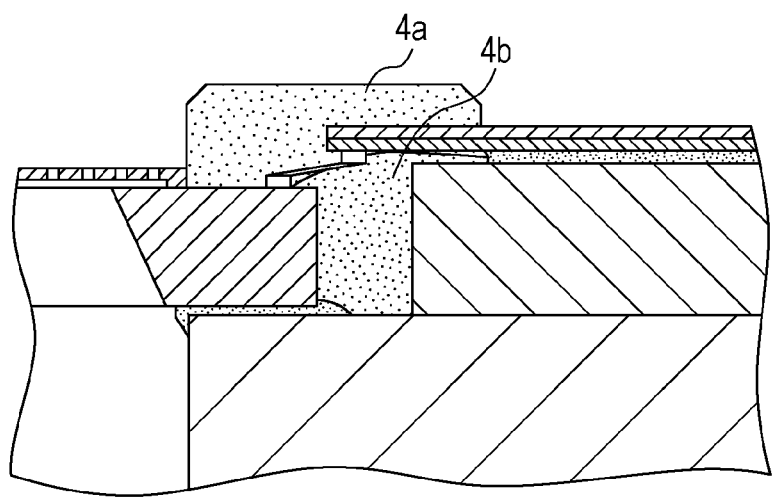

Subsequently, as shown in FIGS. 5A and 5B, as a sealant A 4a, a sealant according to aspects of the present invention is applied to the upper side (surface side) of the lead of the electrical connection portion of the ejection element substrate and the wiring substrate (sealant A application step). After application of the sealant A or simultaneously with application (during application of the sealant), irradiation with activation energy rays, such as ultraviolet light, is sufficiently performed so that the surface of the sealant A can be cured (sealant A irradiation step). Since the sealant according to aspects of the present invention has flowability even immediately after irradiation with ultraviolet light, curing can be performed without bubbles being included at the interface with the sealant B and at the interface with the lead. After completion of ultraviolet light irradiation, two sealants are heated at one time (heating step) so that the sealants including the inner parts can be cured completely. Thereby, an inkjet recording head in which the electrical connection portion (the lead, the driving electrode, and the connecting electrode) is sealed with two kinds of sealant (4a and 4b) can be obtained.

In FIGS. 3A to 5B, different sealants are used for the upper side and the lower side with the lead serving as a boundary line. However, the position of the boundary line can be appropriately moved to the extent that the electrical connection portion can be sealed (covered) and the advantageous effects according to aspects of the present invention can be obtained.

In the second embodiment, unlike the first embodiment shown in FIGS. 3A to 5B in which two kinds of sealant (sealants A and B) are used, an electrode portion is sealed using only a sealant according to aspects of the present invention. The second embodiment will be described in detail with reference to FIGS. 6A to 7B. FIGS. 6A and 7A are enlarged views of the vicinity of an ejection element substrate of an inkjet recording head, viewed from above ink ejection ports, and FIGS. 6B and 7B are partially enlarged cross-sectional views taken along the line VIB-VIB and the line VIIB-VIIB of FIGS. 6A and 7A, respectively.

First, a recording head shown in FIGS. 6A and 6B (same as the recording head shown in FIGS. 3A and 3B) is prepared, in which an ejection element substrate 2 and a wiring substrate 1 are electrically connected with each other by a lead 6. As shown in FIGS. 7A and 7B, using a sealant according to aspects of the present invention as a sealant 4, the sealant 4 is applied to the upper side of the lead 6, and simultaneously (during the application of the sealant), irradiation with activation energy rays (e.g., ultraviolet light) is performed with a light source 14. Since the sealant according to aspects of the present invention has flowability even immediately after irradiation with ultraviolet light, while flowing into the space under the lead 6, the sealant 4 seals the lower side of the lead 6. Furthermore, the sealant according to aspects of the present invention is gradually cured and its flowability decreases. Therefore, the sealant becomes solidified in a state in which the lead 6 is completely sealed (covered). While continuously applying the sealant such that a sufficient sealing thickness is obtained on the upper side of the lead 6, irradiation with ultraviolet light is continued. When the thickness of the sealant becomes a desired value and the surface of the sealant is cured (application step and irradiation step), heating (heating step) is performed so that the sealant including the inner part can be cured completely. Thereby, an inkjet recording head in which the electrical connection portion is sealed with the sealant according to aspects of the present invention can be obtained.

EXAMPLES

Aspects of the present invention will be described below in more detail on the basis of Examples and Comparative Examples, but it is to be understood that the invention is not limited thereto. In the following description, "part" means "part by mass".

Examples 1 to 9 and Comparative Examples 1 to 3

First, in Examples 1 to 9 and Comparative Examples 1 to 3, sealants having the composition shown in Table 1 were prepared. Regarding the sealants, flowability evaluation after ultraviolet light irradiation and evaluation of the ratio of change in mass, which will be described later, were performed. The evaluation results are shown in Table 1.

TABLE 1

| | | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|
| Sealant composition | Dicyclopentadiene type epoxy compound | 20 | 30 | 15 | 25 | 40 | 25 | 25 | 35 | 20 | 20 | 10 | 50 |
| | Hydrogenated bisphenol A epoxy compound 1 | 80 | | 65 | 55 | 35 | | 55 | | | | 30 | 30 |
| | Hydrogenated bisphenol A epoxy compound 2 | | 70 | | | | 55 | | 45 | 45 | | | |
| | Alicyclic epoxy compound | | | | | | | | | | 80 | | |
| | Reactive diluent 1 | | | 20 | 20 | 25 | 20 | | | 35 | | 60 | 20 |
| | Reactive diluent 2 | | | | | | | 20 | 20 | | | | |
| | Cationic polymerization initiator 1 | 5 | 5 | 5 | 5 | 5 | 5 | 5 | 5 | 5 | 5 | 5 | 5 |
| | Cationic polymerization initiator 2 | 1 | 1 | 1 | 1 | 1 | 1 | 1 | 1 | 1 | 1 | 1 | 1 |
| | Silane coupling agent | 5 | 5 | 5 | 5 | 5 | 5 | 5 | 5 | 5 | 5 | 5 | 5 |
| Evaluation | Flowability after ultraviolet light irradiation | ⊙ | ⊙ | ⊙ | ⊙ | ○ | ⊙ | ⊙ | ⊙ | ⊙ | X | ⊙ | X |
| | Ratio of change in mass before and after immersion in ink | ⊙ | ⊙ | ○ | ⊙ | ⊙ | ⊙ | ⊙ | ⊙ | ⊙ | X | X | ○ |

The compounds (resins), initiators, and additives shown in Table 1 are as follows:
Dicyclopentadiene type epoxy compound: HP7200H (trade name; manufactured by DIC Corp.)
Hydrogenated bisphenol A epoxy compound 1: EP-4080S (trade name; manufactured by ADEKA Corporation)
Hydrogenated bisphenol A epoxy compound 2: YX8034 (trade name; manufactured by JER Corp.)
Alicyclic epoxy compound: Celloxide 2021P (trade name; manufactured by Daicel Corp.)
Reactive diluent 1 (epoxy compound): DENACOL EX-121 (trade name; manufactured by Nagase ChemteX Corporation)
Reactive diluent 2 (epoxy compound): ED509-S (trade name; manufactured by ADEKA Corporation)
Cationic polymerization initiator 1 (photo-induced cationic polymerization initiator): SP-170 (trade name; manufactured by ADEKA Corporation)
Cationic polymerization initiator 2 (heat-induced cationic polymerization initiator): CP-66 (trade name; manufactured by ADEKA Corporation)
Silane coupling agent: A-186 (trade name; manufactured by Nippon Unicar Co., Ltd.)
The evaluation methods for evaluating properties of the sealants prepared in Examples and Comparative Examples will be described below.

<Evaluation of Flowability after Ultraviolet Light Irradiation>

The sealant prepared in each of Examples and Comparative Examples, in an amount of 0.2 g, is applied onto a glass plate, and is irradiated with ultraviolet light at 150 mW/cm$^2$×4 sec. Immediately after irradiation, the glass plate is inclined at 45 degrees and left to stand, and the period of time in which the sealant keeps flowing is measured. A longer measured period of time means that, when the sealant is applied to an electrical connection portion, the sealant wraps around the electrical connection portion more satisfactorily. The flowability of the sealant after ultraviolet light irradiation is evaluated on the basis of the following criteria:

⊙: The sealant flows and continues to flow for one minute or more.

○: The sealant flows and continues to flow for 30 seconds or more and less than one minute.

x: The sealant does not flow or continues to flow for less than 30 seconds.

<Evaluation of Ratio of Change in Mass Before and after Immersion in Ink>

The sealant prepared in each of Examples and Comparative Examples is applied onto a teflon mold formed in the dimensions of 20 mm×20 mm×0.15 mm in thickness, and is irradiated with ultraviolet light at 150 mW/cm$^2$×4 seconds. After irradiation, heating is performed at 100° C. for 90 minutes to completely cure the sample (sealant). The cured sample is immersed in ink composed of pure water/glycerol/Direct Black 154 (water-soluble black dye) at the mass ratio of 65/30/5, and left to stand at 60° C. for one week. After the sample is taken out, the ratio of change in mass before and after immersion and storage in ink of the sample (ink absorption ratio) is measured and evaluated on the basis of the criteria described below. A lower value means that absorption of ink into the sealant-cured product is more suppressed.
⊙: The ratio of change in mass is less than 2% by mass.
○: The ratio of change in mass is 2% or more and less than 3% by mass.
x: The ratio of change in mass is 3% by mass or more.

Regarding the evaluation of flowability after ultraviolet light irradiation, in Comparative Examples 1 and 3, the sealant was rapidly cured after ultraviolet light irradiation and did not flow. In Examples 1 to 9 and Comparative Example 2, flowing was observed after ultraviolet light irradiation. In particular, as the content of the dicyclopentadiene type epoxy compound in the sealant was decreased, the period of time in which flowing continued tended to be longer.

Furthermore, regarding the evaluation of ratio of change in mass before and after immersion and storage in ink, in Comparative Examples 1 and 2, the ratio of change in mass was high at more than 3% by mass. In contrast, in Examples 1 to 9 and Comparative Example 3, the ratio of change in mass was less than 3% by mass. Furthermore, in Examples 1 and 2 and 4 to 9, the ratio of change in mass was less than 2% by mass, and thus it was possible to suppress ink absorption at a very high level.

The sealants of Examples 1 to 9 had flowability even after ultraviolet light irradiation (delayed curability), and the cured products thereof were not likely to absorb ink. Thus, two important characteristics of a wiring protection sealant for inkjet recording heads were exhibited.

Next, electric reliability was confirmed in the case where the sealant according to aspects of the present invention was used for an inkjet recording head in Examples described below.

Examples 10 to 18

Inkjet recording heads of Examples 10 to 18 were fabricated in accordance with the first embodiment shown in FIGS. 3A to 5B. In Examples 10 to 18, the sealants used in Examples 1 to 9 shown in Table 1 were respectively used as the sealant 4a for sealing the upper side of the lead. Furthermore, CV5362 (trade name; manufactured by Panasonic Corp.) was used as the sealant 4b for sealing the lower side of the lead. In these Examples, the sealants were applied such that the thickness from the upper surface of the wiring substrate had the same value (400 µm). Each of the sealant on the upper side of the lead and the sealant on the lower side of the lead was irradiated with ultraviolet light immediately after application. The conditions for ultraviolet light irradiation for all were set at 150 mW/cm²×20 seconds. After confirming that the surface of the sealant on the upper side of the lead was cured, heating was performed at 150° C. for 3 hours.

<Evaluation of Reliability>

In order to evaluate bond reliability and electrical connection reliability of the inkjet recording heads fabricated in Examples 10 to 18, print quality evaluation was performed as described below. Specifically, each of the inkjet recording heads was filled with ink composed of pure water/glycerol/Direct Black 154 (water-soluble black dye) at the mass ratio of 65/30/5, and stored at 60° C. for two months. Then, the inkjet recording head was mounted on an inkjet recording apparatus (trade name: MP600, manufactured by CANON KABUSHIKI KAISHA), and print quality evaluation for 10,000 A4-sized sheets. Reliability was evaluated on the inkjet recording heads fabricated in Examples 10 to 18 on the basis of the criteria described below. The evaluation results are shown in Table 2.
○: No blurring or color omission occurs.
x: Blurring or color omission occurs.

TABLE 2

| Results of reliability evaluation | | | | | | | | | |
|---|---|---|---|---|---|---|---|---|---|
| Example | 10 | 11 | 12 | 13 | 14 | 15 | 16 | 17 | 18 |
| Print quality evaluation | ○ | ○ | ○ | ○ | ○ | ○ | ○ | ○ | ○ |

In Examples 10 to 18, there was no problem with print quality even after completion of printing on 10,000 sheets, and stable printing was possible. Furthermore, after printing, the inkjet recording heads were taken out, and electrical mounting parts were observed with a metallograph. As a result, no scrapes or peel offs were found.

Examples 19 to 27 and Comparative Examples 4 to 6

Inkjet recording heads of Examples 19 to 27 and Comparative Examples 4 to 6 were fabricated in accordance with the second embodiment shown in FIGS. 6A to 7B. In Examples 19 to 27 and Comparative Examples 4 to 6, the sealants used in Examples 1 to 9 and Comparative Examples 1 to 3 shown in Table 1 were respectively used as the sealant 4. In these Examples and Comparative Examples, simultaneously with application of the sealant from the upper side of the electrode portion (leads), i.e., during application of the sealant, the applied sealant (in contact with the electrode portion) was irradiated with ultraviolet light at an illumination intensity of 300 mW/cm². The sealant irradiated with ultraviolet light, while gradually flowing from the space between leads into the space between the ejection element substrate and the supporting plate, flowed until the electrode connection portion was completely sealed, and was cured. In the Examples and Comparative Examples, the final thickness of the sealant on the upper side of the lead was set to be the same. After confirming that the surface of the sealant was cured, heating was performed at 150° C. for 3 hours to perform complete curing.

The reliability evaluation described above was performed on the inkjet recording heads fabricated in Examples 19 to 27 and Comparative Example 5. The results thereof are shown in Table 3.

In each of Comparative Examples 4 and 6, the flowability of the sealant, which was applied while being irradiated with ultraviolet light, was markedly decreased. The sealant was cured before flowing into the lower side of the lead, and it was not possible to completely seal the electrical connection portion.

TABLE 3

| | Reliability evaluation | | | | | | | | | | |
|---|---|---|---|---|---|---|---|---|---|---|---|
| | Example | | | | | | | | Comparative Example | | |
| | 19 | 20 | 21 | 22 | 23 | 24 | 25 | 26 | 27 | 4 | 5 | 6 |
| Print quality evaluation | ○ | ○ | ○ | ○ | ○ | ○ | ○ | ○ | ○ | X Sealing cannot be performed. | X | X Sealing cannot be performed. |

In Comparative Example 5, printing stopped before the 7,000th sheet from the start of printing was printed. In contrast, in Examples 19 to 27, there was no problem with print quality even after completion of printing on 10,000 sheets, and stable printing with good print quality was possible.

In Comparative Example 5, it is assumed that short-circuiting occurred because ink was absorbed during printing and migration proceeded in the presence of an applied voltage or adhesiveness of the sealant was decreased owing to the storage of ink, and the sealant was peeled off, or the like.

As described above, by using the sealant according to aspects of the present invention, it is possible to provide an inkjet recording head in which an electrical connection portion can be completely sealed by suppressing inclusion of bubbles, and very high electric reliability can be exhibited even in an environment in contact with ink.

Furthermore, even in the case where only one kind of sealant is used for sealing an electrical connection portion, since flowability and curability of the sealant are severely controlled, it is possible to provide an inkjet recording head having very high electric reliability without decreasing productivity.

Aspects of the present invention can provide a wiring protection sealant for an inkjet recording head, which does not complicate the manufacturing process, which does not decrease productivity even in the case where only one kind of sealant is used, and which imparts very high reliability to sealing of an electrical connection portion, and also can provide a recording head using the sealant and a method for manufacturing the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-233737 filed Oct. 25, 2011, which is hereby incorporated by reference herein in its entirety.

What is claimed is:

1. A sealant comprising:
a dicyclopentadiene type epoxy resin represented by formula 1 below;
a hydrogenated bisphenol A epoxy resin; and
a photo-induced cationic polymerization initiator, wherein the content of the dicyclopentadiene type epoxy resin is 15 to 40 parts by mass relative to 100 parts by mass of the total mass of epoxy resins contained in the sealant:

[Formula 1]

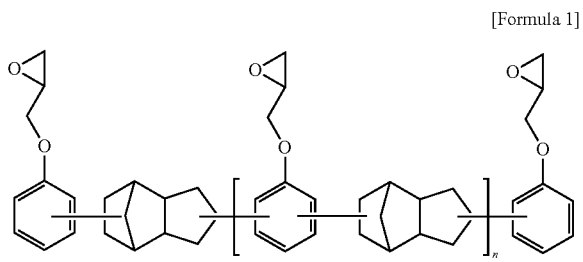

where n represents an integer of 0 to 2.

2. The sealant according to claim 1, wherein the hydrogenated bisphenol A epoxy resin is an epoxy resin represented by formula 2:

[Formula 2]

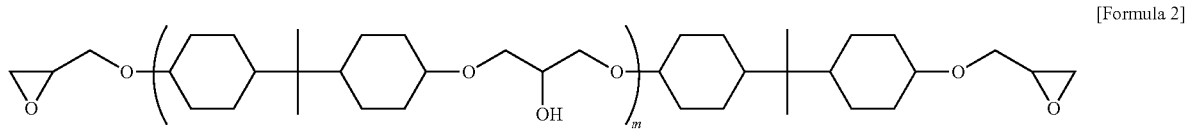

where m represents 0 or 1.

3. An inkjet recording head comprising:
an ejection element substrate which includes a nozzle portion having an ejection port configured to eject ink, an energy-generating unit configured to generate energy for ejecting ink from the ejection port, a driving electrode that receives a driving signal for driving the energy-generating unit, and a substrate provided with an ink supply port for supplying ink to the nozzle portion;
a wiring member provided with a connecting electrode that sends the driving signal for driving the energy-generating unit; and
a supporting member which has an ink supply passage for supplying ink to the ink supply port and which holds and fixes the ejection element substrate and the wiring member,
the driving electrode and the connecting electrode being electrically connected to each other, an electrical connection portion between the driving electrode and the connecting electrode being sealed with at least one sealant, wherein at least one of the at least one sealant is the sealant according to claim 1.

4. The inkjet recording head according to claim 3, wherein the electrical connection portion is sealed with a sealant.

5. A method for manufacturing an inkjet recording head including:
- an ejection element substrate which includes a nozzle portion having an ejection port configured to eject ink, an energy-generating unit configured to generate energy for ejecting ink from the ejection port, a driving electrode that receives a driving signal for driving the energy-generating unit, and a substrate provided with an ink supply port for supplying ink to the nozzle portion;
- a wiring member provided with a connecting electrode that sends the driving signal for driving the energy-generating unit; and
- a supporting member which has an ink supply passage for supplying ink to the ink supply port and which holds and fixes the ejection element substrate and the wiring member,
- the driving electrode and the connecting electrode being electrically connected to each other, an electrical connection portion between the driving electrode and the connecting electrode being sealed with a sealant,
- the method comprising a step of irradiating the sealant with activation energy rays after the sealant has been applied to the electrical connection portion or during the period from the start to the end of application of the sealant,
- wherein, as the sealant, at least the sealant according to claim 1 is used.

6. The method for manufacturing an inkjet recording head according to claim 5, wherein, in the step of irradiating the sealant with activation energy rays, no additional sealant is used, and the sealant is irradiated with activation energy rays during the period from the start to the end of application of the sealant.

* * * * *